Patented Oct. 6, 1942

2,297,728

UNITED STATES PATENT OFFICE 2,297,728

ETHERS OF SUBSTITUTED PHENYL-PHENOLS

Fred Lowell Taylor and Clarence L. Moyle, Midland, Mich., assignors to The Dow Chemical Company, Midland, Mich., a corporation of Michigan No Drawing. Application December 21, 1940, Serial No. 371,143

8 Claims. (Cl. 260—613)

This invention concerns ethers of substituted phenylphenols and is particularly directed to those compounds having the formula

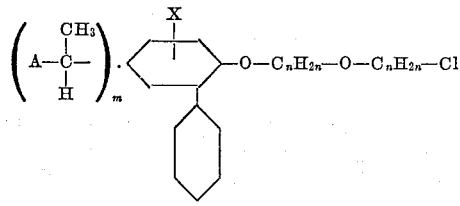

wherein A represents an aromatic radical of the benzene series, X represents halogen, lower alkyl, or hydrogen, $m$ is an integer not greater than 2, and $n$ is an integer from 2 to 4, inclusive.

We have prepared and identified a number of compounds falling under the above formula and found them to be viscous, high-boiling liquids, substantially non-toxic to humans, and particularly adapted for use as low temperature plasticizers in resinous and plastic compositions. Certain of the compounds are also of value as insecticidal toxicants.

The new compounds are conveniently prepared by reacting together a 2-phenyl-alpha-arylethyl-phenol and a lower di-(chloro-alkyl) ether in the presence of aqueous alkali. For example, in preparing a beta-(aromaticoxy)-beta'-chloro-diethyl ether of this class, a mixture of the phenol, beta,beta'-dichloro-diethyl ether, sodium hydroxide, and water is heated to a temperature at which reaction takes place. Regardless of the proportions of phenol and dichloro-diethyl ether employed in the reaction, a mixture of the desired compound and of beta,beta'-(di-aromaticoxy)-diethyl ether is formed. In order that the mono-substituted ether compound be obtained in high yield, an excess of the beta,beta'-dichloro-diethyl ether is preferably employed. While the reaction may be carried out at any suitable temperature, it is convenient to operate at the boiling temperature of the mixture under reflux and at atmospheric pressure. The time required for carrying out the reaction can be somewhat reduced by operating at higher temperatures and under autogenous pressure. Following completion of the reaction, the mixture is cooled and the desired ether compound separated therefrom as by extraction or layering off, and subsequent fractional distillation of the crude reaction product.

The 2-phenyl-alpha-arylethyl-phenols employed as reactants in the preparation of the new compounds are conveniently prepared by reacting an alpha-arylethyl halide with a 2-phenylphenol. Representative of the alpha-arylethyl halides which can be so employed are the alpha-(halo-phenyl)-ethyl chlorides, alpha-(alkyl-phenyl)-ethyl bromides, alpha-(phenyl-phenyl)-ethyl chlorides, alpha-(cyclohexyl-phenyl)-ethyl iodides, alpha-(alkoxy-phenyl)-ethyl chlorides, etc. Among the 2-phenylphenols which may be employed in the reaction are 2-phenyl-phenol, 2-phenyl-4-chloro-phenol, 2-phenyl-4-tertiary-butyl phenol, 2-phenyl-4-cyclohexyl phenol, 2-phenyl-4-tertiary-butyl-5-chloro-phenol, etc. In carrying out the preparation of these alpha-phenylethyl substituted 2-phenylphenols, it is sufficient to heat a mixture of the reactants to a temperature at which hydrogen halide is readily evolved. Such temperature depends somewhat upon the particular reactant employed but is usually between about 100° and about 200° C. If desired, the reaction may be carried out under reduced pressure, or in a current of an inert gas in order to facilitate the removal of the hydrogen halide. Upon completion of the reaction as evidenced by the cessation of hydrogen halide evolution, the substituted phenol product is recovered from the reaction mixture and purified by distillation under reduced pressure, or by crystallization from a suitable solvent.

The preparation and properties of the substituted 2-phenylphenols employed in the preparation of the new compounds to which the present invention is directed are set forth in some detail in co-pending applications Serial No. 263,911 and 331,600, filed March 24, 1939, and April 25, 1940, respectively, by Ralph P. Perkins and Fred Bryner; and Serial No. 331,846, filed April 27, 1940, by Fred L. Taylor and John E. Livak.

The following examples describe in detail the preparation of certain individual members of the new class of compounds but are not to be construed as limiting the invention.

EXAMPLE 1.—*Beta-(2-phenyl-alpha-phenylethyl-phenoxy)-beta'-chloro-diethyl ether*

1370.7 grams (5.0 moles) of 2-phenyl-alpha-phenylethyl-phenol boiling at 201°–204° C. at 2 millimeters pressure, 3575 grams (25.0 moles) of beta,beta'-dichloro-diethyl ether, 215 grams (5.37 moles) of sodium hydroxide, and 400 grams of water were mixed together and heated to 130°–135° C. for 10 hours. The mixture was then cooled to room temperature, washed with dilute sulfuric acid and fractionally distilled to obtain 1267 grams of beta-(2-phenyl-alpha-phenylethyl-phenoxy)-beta'-chloro-diethyl ether as a viscous oil boiling at 243°–250° C. at 2 millimeters pressure and having a specific gravity of 1.14 at 25°/25° C. This compound has the formula

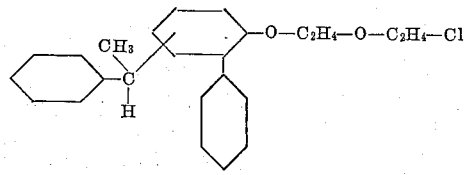

EXAMPLE 2.—*Beta-(2-phenyl-4.6-di-alpha-phenylethyl-phenoxy)-beta'-chloro-diethyl ether*

378 grams (1.0 mole) of 2-phenyl-4.6-di-alpha-phenylethyl-phenol boiling at 251°–270° C. at 2 millimeters pressure, 715 grams (5.0 moles) of beta,beta'-dichloro-diethyl ether, and 136 grams (1.1 moles) of 30 per cent aqueous sodium hydroxide were mixed together and heated to 130°–150° C. for 7 hours. The reaction mixture was then cooled to room temperature, washed with dilute sulfuric acid solution, and fractionally distilled to obtain 216 grams of beta-(2-phenyl-4,6-di-alpha-phenylethyl-phenoxy)-beta'-chlorodiethyl ether as a viscous oil boiling at 290°–295° C. at 2-millimeters pressure and having a specific gravity of 1.13 at 25°/25° C. This compound has the formula

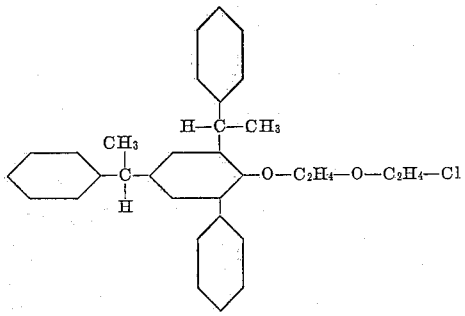

EXAMPLE 3

In a similar manner other alpha-arylethyl substituted 2-phenylphenols may be reacted with beta,beta'-dichloro-diethyl ether to obtain the corresponding ether derivatives of the phenols. The following are representative of the ether compounds obtained:

Beta-[2-phenyl-mono-(para-chloro-alpha-phenylethyl)-phenoxy]-beta'-chloro-diethyl ether having the formula

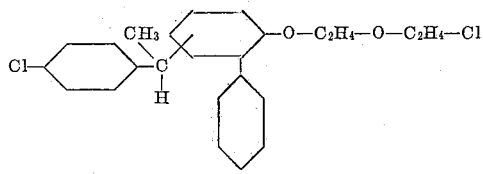

This compound is a colorless viscous liquid boiling at 250°–255° C. at 2 millimeters pressure, and having a specific gravity of 1.21 at 25°/25° C. It was prepared by reacting beta-beta'-dichloro-diethyl ether with 2-phenyl-mono(para-chloro-alpha-phenylethyl)-phenol boiling at 226°–231° C. at 3 millimeters pressure and having a specific gravity of 1.19 at 25°/25° C.

Beta-[2-phenyl-(ortho,para-dichloro-alpha-phenylethyl)-phenoxyl-beta'-chloro-diethyl ether having the formula

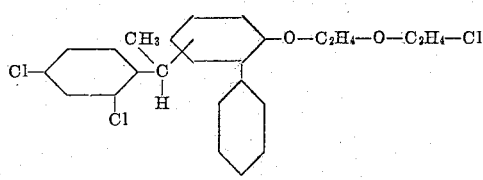

This compound is a straw-colored viscous oil boiling at 280° C. at 2 millimeters pressure and having a specific gravity of 1.27 at 25°/25° C. It was prepared by reacting beta-beta'-dichloro-diethyl ether with 2-phenyl-mono-(ortho-para-dichloro-alpha-phenylethyl)-phenol boiling at 230° C. at 3 millimeters pressure and having a specific gravity of 1.23 at 25°/25° C.

Beta-(2-phenyl-4-tertiary-butyl-6-alpha-phenylethylphenoxy)-beta'-chloro-diethyl ether having the formula

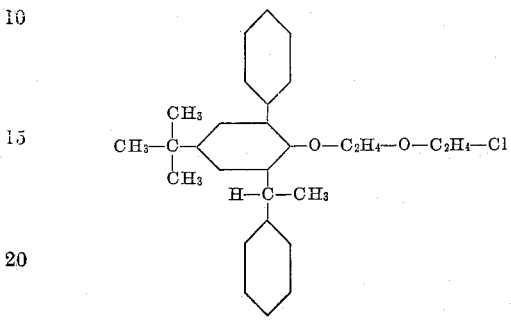

This compound is a light yellow, viscous liquid but slightly mobile at room temperature, boiling at 222°–231° C. at 2 millimeters pressure and having a specific gravity of 1.09 at 25°/25° C. It was prepared by reacting beta,beta'-dichloro-diethyl ether with 2-phenyl-4-tertiary-butyl-6-alpha-phenylethyl-phenol boiling at 210° C. at 3 millimeters pressure and having a specific gravity of 1.055 at 25°/25° C.

Beta-(2-phenyl-alpha-phenylethyl-chlorophenoxy)-beta'-chloro-diethyl ether having the formula

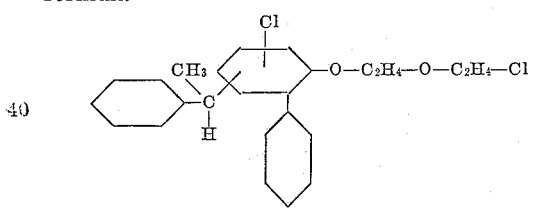

This compound is a viscous yellow liquid boiling at 214°–219° C. at 2 millimeters pressure and having a specific gravity of 1.21 at 25°/25° C. It was prepared by reacting beta,beta'-dichloro-diethyl ether with 2-phenyl-alpha-phenylethyl-chlorophenol boiling at 206°–215° C. at 3 millimeters pressure and having the specific gravity of 1.18 at 25°/25° C.

Other phenols which may be similarly reacted to obtain compounds falling within the scope of the present invention include 2-phenyl-5-chloro-4.6-di-alpha-phenylethyl-phenol, 2-phenyl-mono-(para-tertiary-butyl-alpha-phenylethyl)-phenol, 2-phenyl-4-alpha-phenylethyl-6-bromo-phenol, 2-phenyl-4-iodo-6-alpha-phenylethyl-phenol, 2-phenyl-4-methyl-6-alpha-phenylethyl-phenol, 2-phenyl-4-n-octyl-6-alpha-phenylethyl-phenol, 2-phenyl-4-ethyl-6-(para-cyclohexyl-alpha-phenylethyl)-phenol, etc.

Instead of the beta, beta'-dichloro-diethyl ether employed in the foregoing examples the alpha-arylethyl substituted 2-phenylphenols may be reacted with other lower di-(chloro-alkyl) ethers. Representative of such ether compounds which may be substituted for those shown in the examples are: beta,beta'-dichloro-dipropyl ether; gamma, gamma'-dichloro-dipropyl ether; beta, gamma'-dichloro-dipropyl ether; delta,delta'-dichloro-dibutyl ether; beta,beta'-dichloro-dibutyl ether; etc.

We claim:
1. A compound having the formula

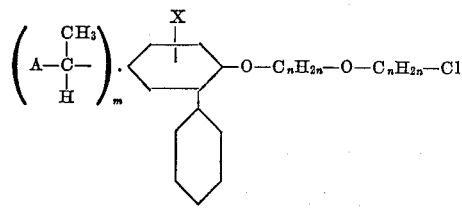

wherein A represents an aromatic radical of the benzene series, X is a member of the group consisting of halogen, lower alkyl, and hydrogen, m is an integer not greater than 2, and n is an integer from 2 to 4, inclusive.

2. A compound having the formula

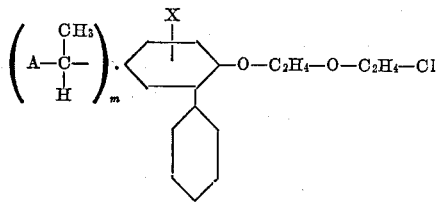

wherein A represents an aromatic radical of the benzene series, X is a member of the group consisting of halogen, lower alkyl, and hydrogen, and m is an integer not greater than 2.

3. A compound having the formula

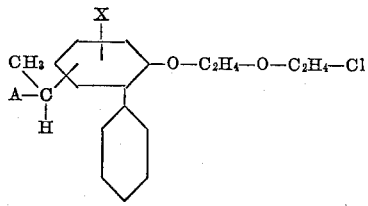

wherein A represents an aromatic radical of the benzene series, and X is a member of the group consisting of halogen, lower alkyl, and hydrogen.

4. A compound having the formula

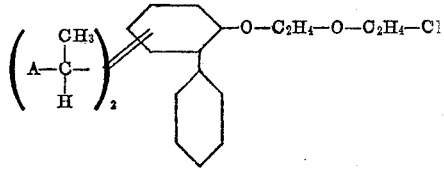

wherein A represents an aromatic radical of the benzene series.

5. A compound having the formula

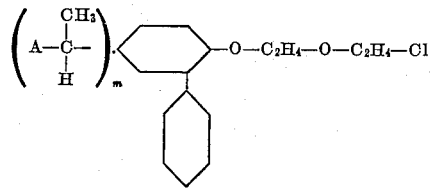

wherein A represents an aromatic radical of the benzene series, and m is an integer not greater than 2.

6. A compound having the formula

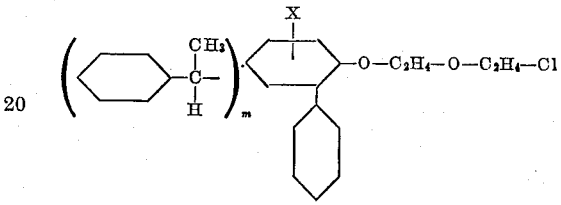

wherein X represents a member of the group consisting of halogen, lower alkyl, and hydrogen, and m is an integer not greater than 2.

7. A compound having the formula

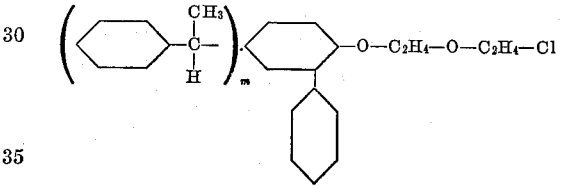

wherein m is an integer not greater than 2.

8. A compound having the formula

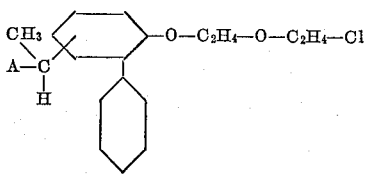

wherein A represents an aromatic radical of the benzene series.

FRED LOWELL TAYLOR.
CLARENCE L. MOYLE.